United States Patent [19]

Kamifuji et al.

[11] Patent Number: 4,547,852

[45] Date of Patent: Oct. 15, 1985

[54] ENGINE CONTROL APPARATUS AND CONTROL METHOD

[75] Inventors: Hiroshi Kamifuji; Tomoo Ito, both of Katsuta; Haruhiko Kobayashi, Ibaraki; Tomiya Itakura, Katsuta, all of Japan

[73] Assignees: Hitachi, Ltd., Tokyo; Hitachi Automotive Eng. Co., Ltd., Katsuta, both of Japan

[21] Appl. No.: 465,618

[22] Filed: Feb. 10, 1983

[30] Foreign Application Priority Data

Feb. 17, 1982 [JP] Japan .................................. 57-22846

[51] Int. Cl.[4] ............................ F02P 5/08; F02B 5/02

[52] U.S. Cl. ............................... 364/431.04; 123/417; 123/422; 123/423; 364/431.07

[58] Field of Search ................... 364/431.04; 123/416, 123/417, 418, 419, 422, 423

[56] References Cited

U.S. PATENT DOCUMENTS 4,220,125 9/1980 Nishida et al. ...................... 123/416
4,230,078 10/1980 Hattori et al. ...................... 123/416
4,236,214 11/1980 Sasayama ...................... 364/431.04
4,347,570 8/1982 Akiyama et al. .............. 364/431.04
4,385,606 5/1983 Hattori et al. ...................... 123/416
4,419,974 12/1983 Nagase et al. ...................... 123/418
4,421,085 12/1983 Nagase et al. ...................... 123/416

*Primary Examiner*—Felix D. Gruber
*Attorney, Agent, or Firm*—Antonelli, Terry & Wands

[57] ABSTRACT

An engine control apparatus having a microcomputer which controls an operating condition modifying means to modify the operating condition of the engine, wherein the absolute value $\Delta C$ of the difference, $C_{now}-C_{old}$ is calculated from a previously obtained basic amount of control $C_{old}$, and a newly obtained basic amount of control $C_{now}$, a correction coefficient K is determined which takes a value of 1 to nearly 0 as the $\Delta C$ is increased, and then the $C_{set}$ of $$C_{set}=K\times(C_{now}-C_{old})+C_{old}$$

is calculated as an actual basic amount of control.

8 Claims, 7 Drawing Figures

SPARK PLUG
SPARK PLUG
DISTRIBUTOR
IGNITION COIL
POWER TRANSISTOR
RAM
CPU
ROM
COUNTER
REG.
I/O
A/D CONVERTER
INTAKE PRESSURE SIGNAL GENERATOR
REFERENCE SIGNAL GENERATOR
ANGLE SIGNAL GENERATOR
1
2
3
4
5
6
7
8
9
9
10
11
12
30
31

INTAKE NEGATIVE PRESSURE (mmHg) / ROTATION SPEED (RPM) (X100)

| (mmHg) | 4 | 6 | 8 | 12 | 16 | 20 | 24 | 28 | 32 | 36 | 40 |
|---|---|---|---|---|---|---|---|---|---|---|---|
| -30 | - | - | - | - | - | - | - | - | - | - | |
| -50 | - | 2 | 4 | 5 | 5 | 8 | - | - | - | - | |
| -70 | - | 6 | 8 | 10 | 10 | 12 | - | - | - | - | |
| -100 | - | 10 | 10 | 12 | 14 | 14 | - | - | - | - | |
| -150 | - | 14 | 14 | 16 | 22 | 22 | - | - | - | - | |
| -200 | - | 18 | 18 | 20 | 26 | 26 | - | - | - | - | |
| -250 | - | 22 | 22 | 25 | 28 | 28 | - | - | - | - | |
| -300 | - | 19 | 19 | 21 | 22 | 26 | - | - | - | - | |
| -350 | - | 18 | 18 | 20 | 21 | 23 | - | - | - | - | |
| -400 | - | 16 | 16 | 16 | 18 | 22 | - | - | - | - | |
| -450 | - | 15 | 15 | 16 | 18 | 22 | - | - | - | - | |
| -500 | - | 13 | 13 | 16 | 18 | 22 | - | - | - | - | |
| -550 | - | 11 | 11 | 14 | 16 | 20 | - | - | - | - | |
| -600 | - | 9 | 9 | 12 | 14 | 18 | - | - | - | - | |
| -650 | - | 8 | 8 | 10 | 12 | 16 | - | - | - | - | |
| -700 | - | - | - | - | - | - | - | - | - | - | |

START
100
READ IN ROTATION SPEED DATA N AND PRESSURE DATA P
200
(N, P) → θADVNOW
300
θADVNOW > θADVOLD
YES
NO
400
θADVOLD − θADVOLD → ΔθADV
500
θADVNOW − θADVOLD → ΔθADV
ΔθADV → K
600
700
K * (θADVNOW − θADVOLD) + θADVOLD → θADVSET
STORE θADVSET IN REGISTER
800
END

FIG. 5
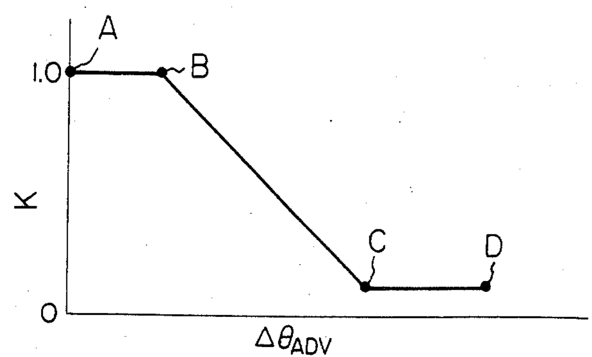
FIG. 6
| $\Delta\theta_{ADV}$ | 0 | 5 | 20 | 35 | 50 | --- | --- | --- |
|---|---|---|---|---|---|---|---|---|
| K | 1.0 | 1.0 | 0.6 | 0.1 | 0.1 | --- | --- | --- |
FIG. 7
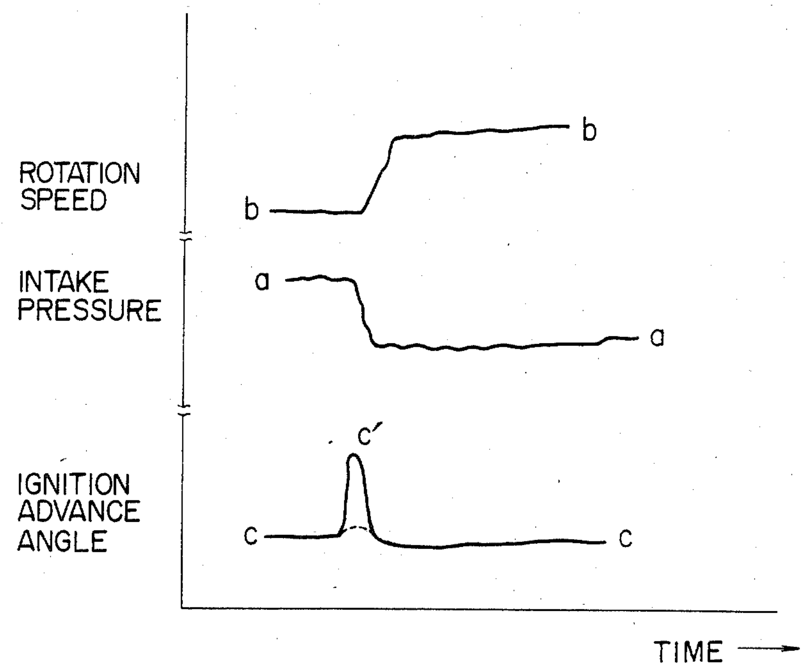

ENGINE CONTROL APPARATUS AND CONTROL METHOD

BACKGROUND OF THE INVENTION

This invention relates to an engine control apparatus and a control method useful to drive an engine in the best condition, and particularly to an ignition advance angle control apparatus and control method.

Recently, an engine control apparatus with a microcomputer has been proposed in order to drive the engine in the best condition.

In such an engine control apparatus with a microcomputer, at least two parameters indicative of the operating condition of the engine are each divided into a definite number of values, and the operating condition of the engine is controlled at each combination of these values by an operating condition control means, in which case the basic amount of control that the control means operates from is read from a fixed data memory (generally a read-only memory) in which the basic amounts of control are stored, in accordance with the operating condition of the engine and the operating condition control means is driven on the basis of this basic amount of control.

When the operating condition control means is driven by the basic amount of control stored in such a fixed data memory, an abrupt change of the operating condition of the engine, such as a sudden acceleration or deceleration, will naturally require a change in the combination of parameter values which is applied to the fixed data memory, and during the change, basic amounts of control are read from the fixed memory and used to drive the operating condition control means.

The basic amount of control that the operating condition control means relies upon for controlling the operating condition of the engine is generally a predetermined value for the best control of the operating condition of the engine at that time, but when the operating condition of the engine is suddenly changed by a large amount in a short time, the basic amounts of control read during such abrupt change do not always correspond to the proper operating conditions of the engine at that time.

Therefore, the engine cannot be operated in the best condition by the operating condition control means under such inadequate basic amounts of control.

SUMMARY OF THE INVENTION

An object of this invention is to provide an ignition advance angle control apparatus and a control method for an engine in which, even if the operating condition of the engine is suddenly changed, the basic amount of control that the operating condition control means is controlled to modify is made near to a proper value corresponding to the operating condition of the engine at that time.

The feature of this invention is that a previous basic amount of control $C_{old}$, a new basic amount of control $C_{now}$ and the absolute value $\Delta C$ of the difference $C_{now}-C_{old}$ are determined at each read period of a fixed data memory, a correction coefficient K is read from a correction coefficient data memory having stored therein the correction coefficient K having values of 1 down to nearly 0 to be taken as the $\Delta C$ increases, and the actual basic amount of control at this time is determined by calculating the $C_{set}$ of $$C_{set}=f(K)+C_{old}$$

where f(K) is a function of the coefficient K with respect to $\Delta C$.

BRIEF DESCRIPTION OF THE DRAWINGS

In the accompanying drawings:

FIG. 5 shows a characteristic curve of correction coefficient;

FIG. 6 shows the correction coefficients of FIG. 5 stored as data; and

FIG. 7 is a graph showing the ignition advance angle with respect to the intake negative pressure and rotation speed in the accelerated condition.

DETAILED DESCRIPTION OF THE PREFERRED EMBODIMENT

Figure 1:
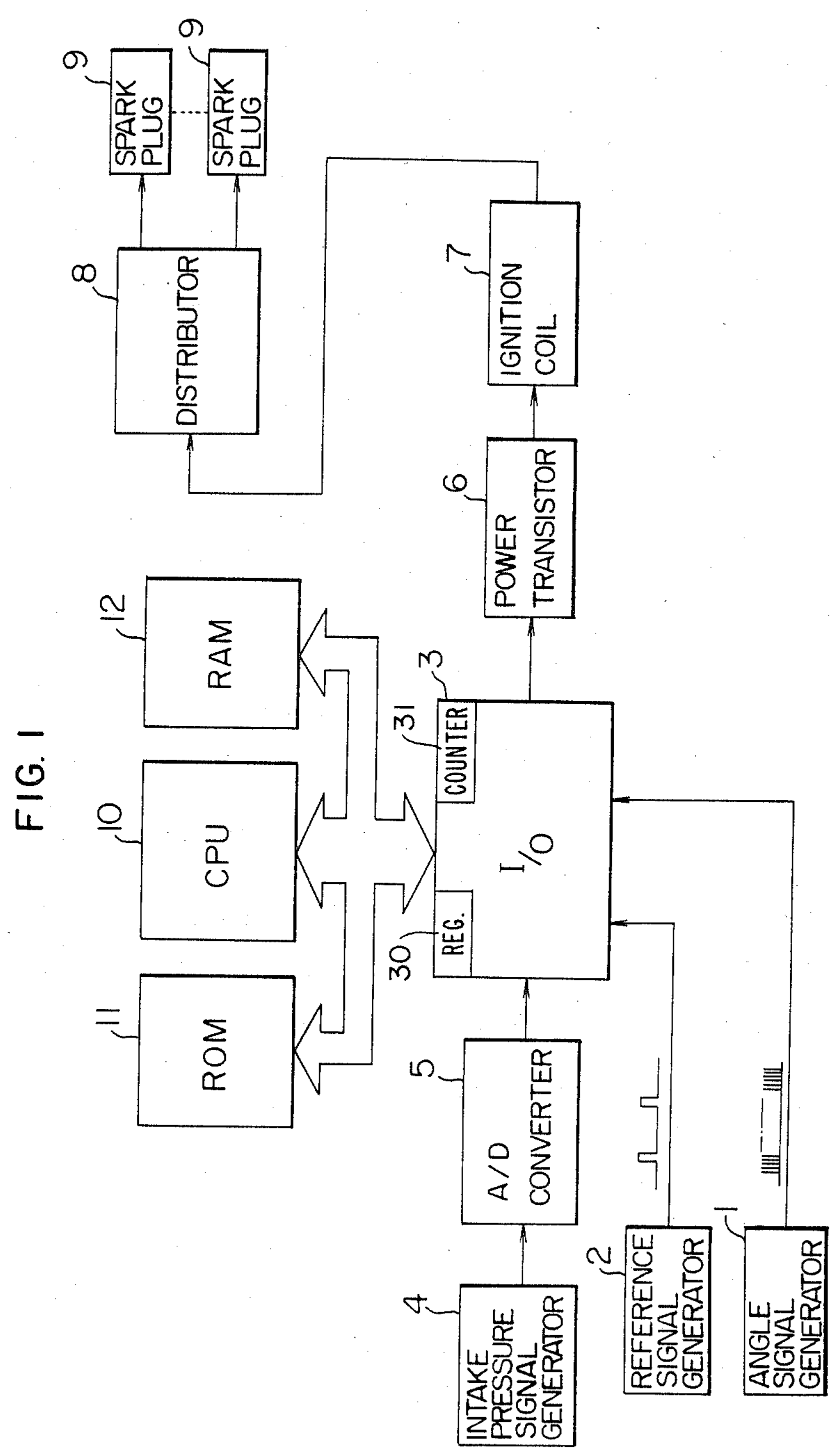
FIG. 1 is a block diagram of an embodiment of the ignition advance angle control apparatus of this invention.

Description is first made of an engine control apparatus to which this invention is applied, here particularly an ignition control apparatus with reference to FIG. 1.

Referring to FIG. 1, an angle signal generating means 1 provided in a distributor 8 coupled to the crankshaft of an engine generates an angle pulse for each degree and a reference signal generating means 2 provided in the distributor 8 also generates a reference pulse for each 180 degrees. These signals are applied to an input-/output unit (hereinafter, referred to as an I/O unit) 3. An analog output from an intake negative pressure signal generating means 4 is converted by an analog-to-digital converter (hereinafter, referred to as an A/D converter) 5, to a digital value, which is applied to the I/O unit 3, which includes a register 30 and a counter 31. The output of the I/O unit 3 is applied to a power transistor 6, cutting it off so that a high voltage is induced in an ignition coil 7. The high voltage induced in the ignition coil 7 is supplied through the distributor 8 to spark plugs 9.

Figure 2:
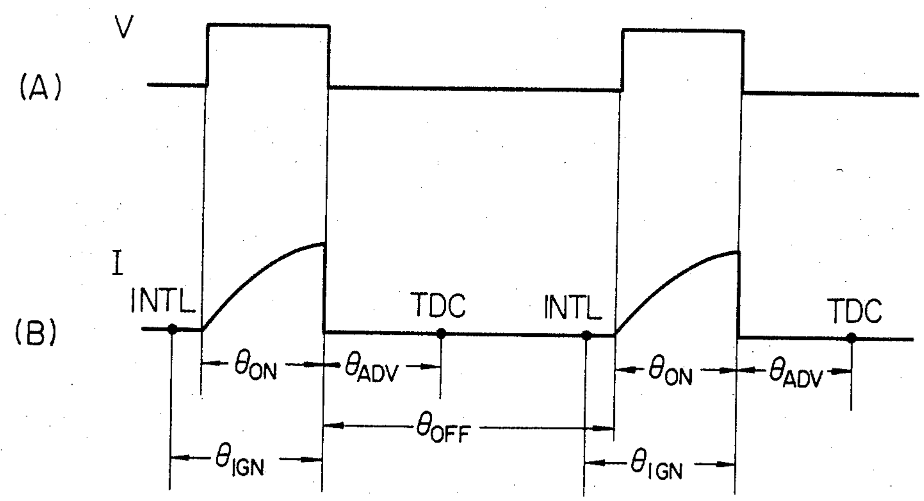
FIG. 2 is a waveform diagram showing the timing of ignition.

FIG. 2 shows the waveforms of the output voltage from the I/O unit 3 and primary current in the ignition coil 7. The rectangular waveform shown at (A) is applied to the power transistor 6, and as a result the current shown at (B) is induced in the primary coil of the ignition coil 7.

The power transistor 6 is conductive at the leading edge of the rectangular voltage shown in FIG. 2 at (A), and thereby the primary current of the ignition coil 7 rises as shown in FIG. 2 at (B). Then, the power transistor 6 is cut off at the trailing edge of the rectangular wave voltage shown in FIG. 2 at (A), and thereby the primary coil current is cut off as shown in FIG. 2 at (B). At this time, a high voltage is induced in the secondary coil of the ignition coil 7.

In FIG. 2 at (B), TDC represents the top dead center of a piston of the engine. In a 4-cylinder engine, one of the pistons reaches the top dead center each time the crankshaft is rotated 180 degrees. $\theta_{ADV}$ is the ignition advance angle which is an angle between the ignition point and the top dead center TDC. INTL is the reference pulse angle which is determined by the reference pulse from the reference signal generating means 2, and in this embodiment is provided at intervals of 180 degrees.

The cut-off points of the primary coil current in the ignition coil 7, or ignition time points are determined by the angle $\theta_{IGN}$ from the reference pulse angle INTL. That is, the ignition advance angle $\theta_{ADV}$ is controlled by the change of the $\theta_{IGN}$.

The start of the primary coil current flow in the ignition coil 7, or the conduction time $\theta_{ON}$ of the transistor 6 is controlled by the angle $\theta_{OFF}$ from the previous ignition time.

Again, referring to FIG. 1, the I/O unit 3 is connected through bus lines 13 to a central processing unit (hereinafter, referred to as CPU) 10, a fixed data memory for read-only operation, here a read-only memory (hereinafter, referred to as ROM) 11 and a random access memory (hereinafter, referred to as RAM) 12 capable of read and write.

The CPU 10 performs data communication and data arithmetic operations between the ROM 11, RAM 12 and I/O unit 3. The ROM 11 has stored therein fixed data, control programs and so on useful for the arithmetic operation, and RAM 12 has a function of temporarily storing the values obtained by the arithmetic operation.

Figure 3:
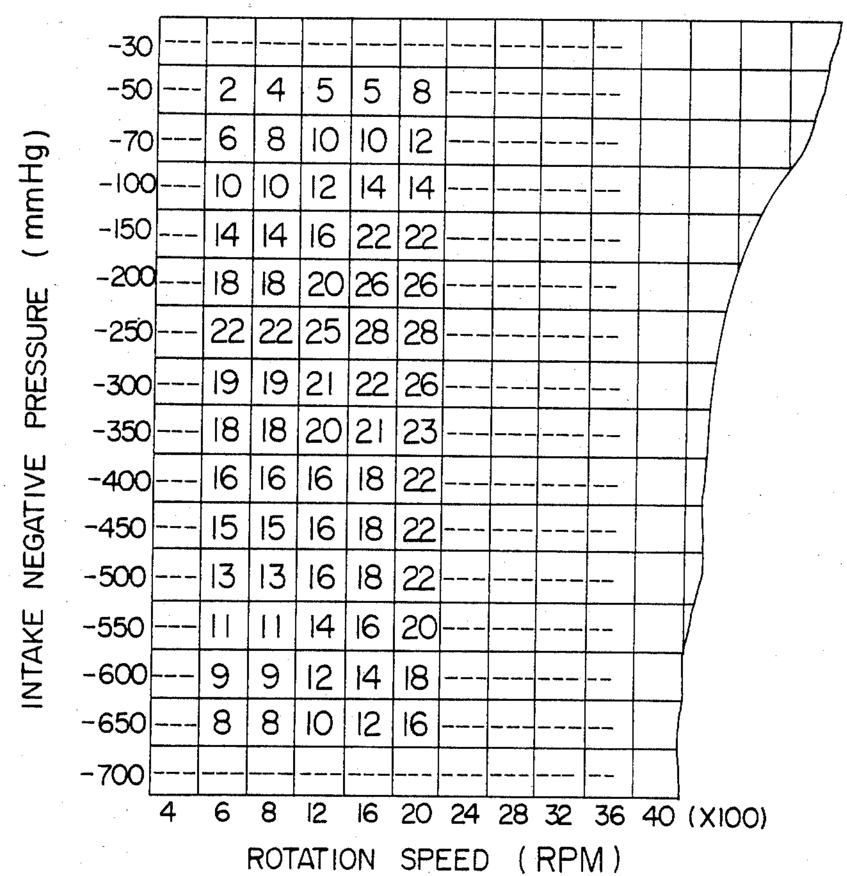
FIG. 3 shows ignition advance angles in the fixed data memory which correspond to the combinations of rotation speed and intake negative pressure.

The ROM 11 contains an ignition advance angle map storing in a lattice form the ignition advance angle $\theta_{ADV}$ determined by the intake negative pressure and the rotation speed of the engine, as shown in FIG. 3, and thus the ignition advance angles are determined by reading the ignition advance angle map and computing.

Thus, the signal from the intake negative pressure signal generating means 4 is converted by the A/D converter 5 to the digital pressure data P at each period of time, and stored in the RAM 12.

Then, the data N for the rotation speed is determined by the signals from the angle signal generating means 1 and reference signal generating means 2.

Then, the ignition advance angle $\theta_{ADV}$ on the ignition advance angle map within the ROM 11 is searched for on the basis of the pressure data P and the rotation speed data N and stored in the RAM 12.

Thereafter, the value, $\theta_{IGN}$ shown in FIG. 2 is determined by the ignition advance angle $\theta_{ADV}$ stored in the RAM 12, by subtracting the ignition advance angle $\theta_{ADV}$ from the predetermined reference pulse angle INTL.

Subsequently, the number of angle pulses corresponding to the $\theta_{IGN}$ is determined and stored in the register 30 incorporated in the I/O unit 3. At this time, the counter 31 in the I/O unit 3 starts to count the angle pulse as soon as the reference pulse angle INTL occurs, and when the contents of this counter 31 reach the number of angle pulses corresponding to the $\theta_{IGN}$ within the register 30, the comparator within the I/O unit 3 operates to cut off the power transistor 6 thereby causing ignition.

The ignition control apparatus using a microcomputer as mentioned above is well known.

In such ignition control apparatus, the ignition advance angle $\theta_{ADV}$ on the ignition advance angle map within the ROM 11 is searched for at each predetermined period and used for computation of the ignition advance angle.

Thus, when the engine is suddenly accelerated from low-speed to high-speed running, the intake pressure for determining the ignition advance angle $\theta_{ADV}$ is rapidly changed and the ignition advance angle $\theta_{ADV}$ on the ignition advance angle map to which reference is made at that time is moved.

Therefore, the ignition advance angle $\theta_{ADV}$ on the ignition advance angle map is searched for during the driving. In general, since the ignition advance angle $\theta_{ADV}$ advances much upon middle-speed running, the ignition advance angle $\theta_{ADV}$ at the time of middle speed running is searched for and determined when the engine is suddenly accelerated from low-speed to high-speed running but is not stabilized yet at the high-speed running condition, or when it approaches the high-speed condition, there is caused a problem of knocking.

On the contrary, when the engine is suddenly decelerated from high-speed running, afterburning takes place for the same reason.

Therefore, in accordance with this invention, in order to avoid the abnormal angle advance resulting from such transient running, the preceding ignition advance angle $\theta_{ADVold}$ and the current ignition advance angle $\theta_{ADVnow}$ are used to produce the absolute value $\Delta\theta_{ADV}$ of the difference $\theta_{ADVnow}-\theta_{ADVold}$ and a correction coefficient K which approaches zero from 1 as the $\Delta\theta_{ADV}$ increases is read from a correction coefficient data memory. Then, the actual ignition advance angle of this time, $\theta_{ADVset}$ is determined from $$\theta_{ADVset}=f(K)+\theta_{ADVold}$$

where f(K) is a function of the correction coefficient K which depends on the difference value $\Delta\theta_{ADV}$. The f(K) is, in practice, $K\times(\theta_{ADVnow}-\theta_{ADVold})$.

This will be described with reference to the flow chart of FIG. 4.

Figure 4:
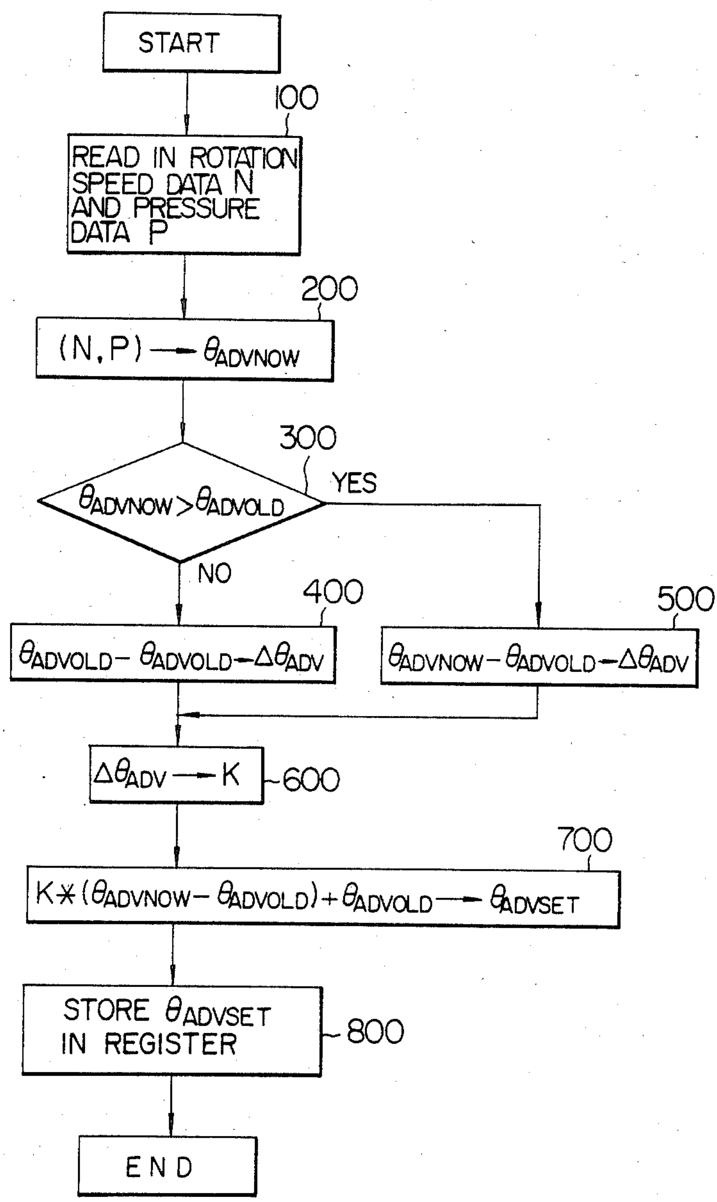
FIG. 4 is a flow chart of an embodiment of the control method of this invention.

The flow chart of FIG. 4 is started and repeated with a certain period by the control program. At step 100, the pressure data P of intake pressure and rotation speed data N are read.

At step 200, the ignition advance angle $\theta_{ADVnow}$ corresponding to the data N and P read in at step 100 is searched for on the ignition advance angle map and stored at address $A_{now}$ of RAM 12.

At step 300, the ignition advance angle $\theta_{ADVnow}$ determined at step 200 is compared with the previously determined ignition advance angle $\theta_{ADVold}$ stored at address $A_{old}$ of the RAM 12.

When the result at step 300 is $\theta_{ADVnow}>\theta_{ADVold}$, the $\Delta\theta_{ADV}$ of $\theta_{ADVnow}-\theta_{ADVold}$ is determined at step 500. When it is $\theta_{ADVnow}<\theta_{ADVold}$, the $\Delta\theta_{ADV}$ of $\theta_{ADVold}-\theta_{ADVnow}$ is determined at step 400. Then, the $\Delta\theta_{ADV}$ is stored at address $\Delta A_d$ of the RAM 12.

At step 600, the correction coefficient K corresponding to the difference $\Delta\theta_{ADV}$ between the provious ignition advance angle $\theta_{ADVold}$ and this ignition advance angle $\theta_{ADVnow}$ is obtained and stored at address $A_c$ of the RAM 12.

The correction coefficient K is a value changing in the range from 1.0 to nearly 0 as the $\Delta\theta_{ADV}$ changes from 0 as shown in the graph A-B-C-D of FIG. 5. It will be seen that the K is maintained at 1 in the interval A-B, decreased to nearly 0 with a slope in B-C and kept at nearly 0 in C-D.

In effect, such values of K corresponding to those of the $\Delta\theta_{ADV}$ as shown in FIG. 6 are stored in the correction coefficient data memory within the ROM.

At step 700, the value of $\theta_{ADVset}$ is calculated from $$\theta_{ADVset}=K\times(\theta_{ADVnow}-\theta_{ADVold})+\theta_{ADVold}$$

and stored at address $A_{old}$ of the RAM 12.

Finally, at step 800, the $\theta_{ADVset}$ obtained at step 700 is stored in a register 30 of the I/O unit 3 to determine the ignition advance angle. In this case, the $\theta_{ADVset}$ stored at address $A_{old}$ of the RAM 12 at step 700 is used as the $\theta_{ADVold}$ for the next cycle.

In the conventional method, when the running condition as shown in FIG. 3 is changed from the rotation speed of 800 rpm, intake negative pressure of −600 mmHg to 1600 rpm, −70 mmHg, the ignition advance angle $\theta_{ADV}$ is changed slightly from 9 degrees to 10 degrees. However, during the change the engine passes through the middle speed running condition which needs a very large value of ignition advance angle $\theta_{ADV}$. That is, when the intake negative pressure and rotation speed are changed as shown in FIG. 7 by a-a, and b-b, the ignition advance angle $\theta_{ADV}$ changes along line c-c'-c in FIG. 7 and thus has peak c' of excess advance angle causing the knocking.

If the previous ignition advance angle $\theta_{advold}$ is weighted with more importance in proportion to the difference between the previous ignition advance angle $\theta_{ADVold}$ and the this ignition advance angle $\theta_{ADVnow}$, the excess advance angle peak c' in FIG. 7 can be reduced as indicated by a broken line so that abnormal advance angle is prevented from occurring and thus no knocking is caused.

In the case of rapid deceleration, afterburning can be prevented for the same reason.

What is claimed is:

1. An ignition advance angle control apparatus for an engine comprising:

(a) at least two parameter detecting means, each for detecting a respective parameter indicative of an operating condition of an engine;

(b) ignition control means for controlling the ignition timing of said engine;

(c) a fixed data memory in which are mapped ignition advance angles as basic amounts of control predetermined on the basis of the two parameters detected by the two parameter detecting means in order to determine the ignition advance angle on which operation of said ignition control means is to be based;

(d) a correction coefficient data memory in which are mapped correction coefficients having values of 1 down to nearly zero corresponding to increasing values of the difference between the previous ignition advance angle and the ignition advance angle which is determined in each period at which said fixed data memory is read;

(e) a microprocessor for adding to said previously determined ignition advance angle at each read period of said fixed data memory a value which is a function of the correction coefficient stored in said correction coefficient data memory in correspondence to said difference; and (f) output means responsive to an ignition advance angle calculated by said microprocessor for producing an actual output representing the calculated ignition advance angle and for supplying the same to said ignition control means.

2. A control apparatus according to claim 1, wherein said microprocessor calculates a previously obtained ignition advance angle $\theta_{ADVold}$, a newly obtained ignition advance angle $\theta_{ADVnow}$, and the absolute value $\Delta\theta_{ADV}$ of the difference $\theta_{ADVnow}-\theta_{ADVold}$, reads out a correction coefficient K on the basis of the $\Delta\theta_{ADV}$ from said correction coefficient data memory and then calculates the following equation:

$$\theta_{set}=K\times(\theta_{ADVnow}-\theta_{ADVold})+\theta_{ADVold}.$$

3. An engine control apparatus according to claim 2, wherein the parameters detected by said two parameter detecting means are the rotation speed and intake pressure of the engine.

4. A control apparatus according to claim 1, wherein the output produced by said output means is a pulse signal whose trailing edge corresponds to the time of ignition of the engine.

5. A control method for controlling the ignition advance angle in an engine control apparatus having:

at least two parameter detecting means, each for detecting a respective parameter indicative of an operating condition of an engine;

ignition control means for controlling the ignition timing of the engine;

a fixed data memory mapping therein basic amounts of control predetermined on the basis of the two parameters detected by the two parameter detecting means in order to determine the ignition advance angle on which operation of said ignition control means is to be based;

a microprocessor for reading out an ignition advance angle from said fixed data memory on the basis of the parameters detected by said two parameter detecting means and for then calculating an actual ignition advance angle to be applied to said ignition control means; and output means responsive to the actual ignition advance angle calculated by said microprocessor to produce an actual output representing the calculated ignition advance angle and for supplying the same to said ignition control means; said method comprising the steps of:

(a) detecting two parameters by means of the two parameter detecting means;

(b) reading out an ignition advance angle based on said two detected parameters from said fixed data memory;

(c) determining the difference, $\Delta\theta_{ADV}$ between the ignition advance angle $\theta_{ADV\ now}$ read at step (b) and the previously obtained ignition advance angle $\theta_{ADVold}$;

(d) obtaining a correction coefficient K on the basis of the $\Delta\theta_{ADV}$ from a correction coefficient data memory having mapped therein the correction coefficients K having values of 1 down to nearly 0 to be taken as the $\Delta\theta_{ADV}$ determined at step (c) is increased;

(e) calculating on the basis of the values obtained at steps (a), (b) and (c) the following equation:

$$\theta_{ADVset}=f(K)+\theta_{ADVold}$$

where f(K) is a function of the coefficient K corresponding to $\Delta\theta_{ADV}$; and (f) supplying the value calculated at step (e) to said output means.

6. A control method according to claim 5, wherein the equation at step (e) is specifically $\theta_{ADVset} = K \times (\theta_{ADVnow} - \theta_{ADVold}) + \theta_{ADVold}$.

7. A control method according to claim 5, wherein the parameters detected by said two parameter detecting means are the rotation speed and intake pressure of the engine.

8. A control method according to claim 5, wherein the output produced by said output means is a pulse signal whose trailing edge corresponds to time of an ignition of the engine.

* * * * *